Sept. 11, 1934.  W. B. F. HALL  1,973,480
OPTICAL ILLUSION DEVICE
Filed May 8, 1933   2 Sheets-Sheet 1

Inventor:
William B. F. Hall,
By: Arthur W. Nelson
Atty.

Sept. 11, 1934.  W. B. F. HALL  1,973,480
OPTICAL ILLUSION DEVICE
Filed May 8, 1933  2 Sheets-Sheet 2
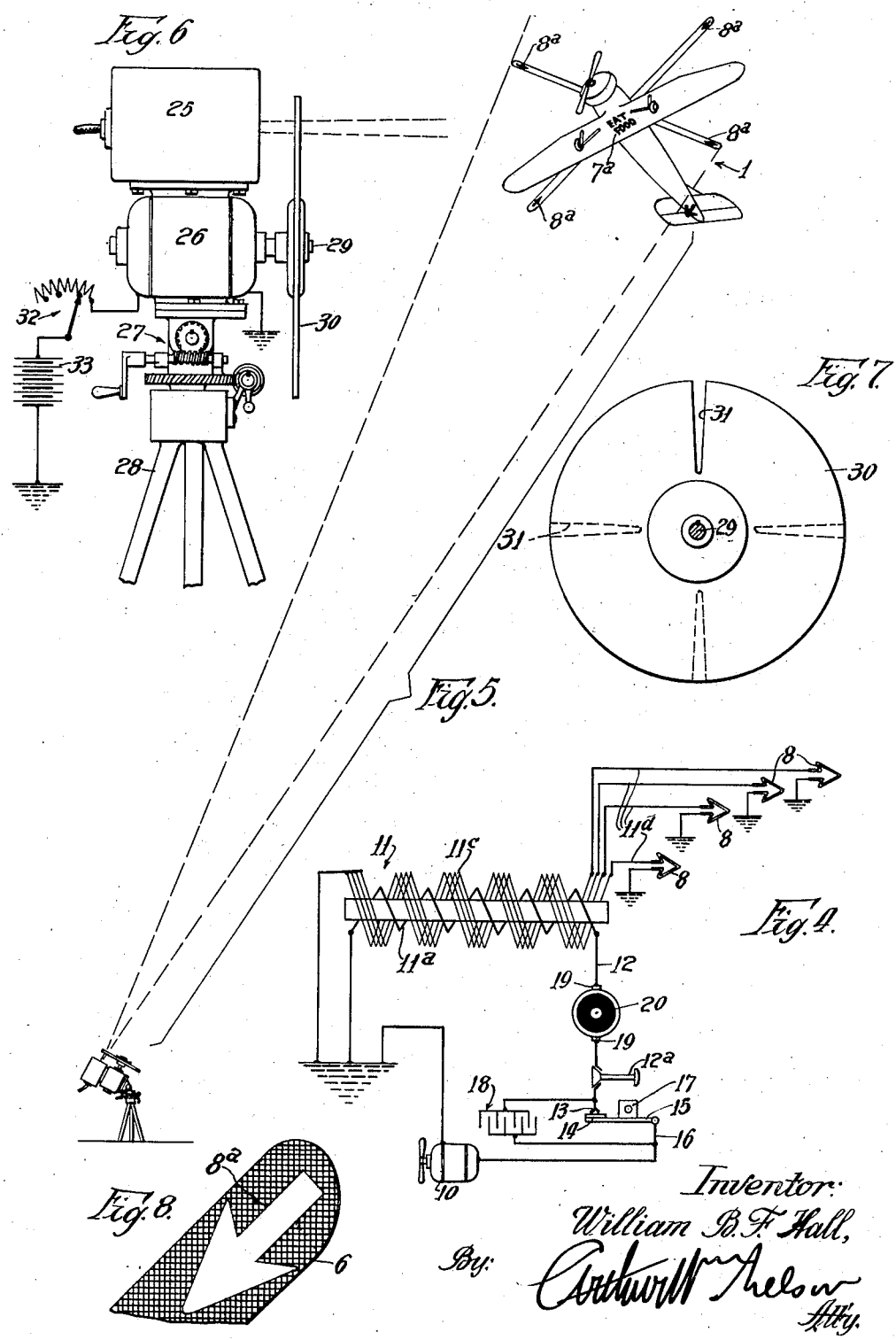

Patented Sept. 11, 1934

1,973,480

UNITED STATES PATENT OFFICE 1,973,480

OPTICAL ILLUSION DEVICE

William B. F. Hall, Fort Wayne, Ind., assignor to The Magnavox Company, Fort Wayne, Ind., a corporation of Arizona Application May 8, 1933, Serial No. 669,865

6 Claims. (Cl. 40—130)

This invention relates to improvements in an optical illusion device and it consists of the matters hereinafter described and more particularly pointed out in the appended claims:

One of the objects of the present invention is to provide a device capable of producing an illusion which strongly attracts and holds one's attention by the mystifying effects produced.

Another object of the invention is to provide a device of this kind having advantages making it especially useful as a medium of advertising.

Still a further object of the invention is to provide a device of this kind which is so constructed that the illusion presented may be readily changed to enhance its attention attracting and holding characteristics.

Still another object of the invention is to provide a device of this kind whereby aerial advertising may be readily carried out with the aid of aircraft such as an autogiro and associated illuminating means.

Still a further object of the invention is to provide a device of this kind which is simple in construction and practical and economical in operation.

The above mentioned objects of the invention, as well as others, together with the many advantages thereof, will more fully appear as I proceed with my specification.

In the drawings:

Fig. 4 is a view similar to Fig. 2 but illustrates a modified form of circuit;

Fig. 5 is a view illustrating a modified form of the invention employing indirect illumination for the image producing parts;

Fig. 6 is a view in side elevation on an enlarged scale of the illuminating means employed in connection with that embodiment of the invention shown in Fig. 5;

Fig. 7 is a view in elevation of the interrupter disc of the illuminating means shown in Fig. 6; and Fig. 8 is a fragmentary detail view in elevation on an enlarged scale, of the tip end of one of the rotor blades of the autogiro and illustrates more particularly a modified form of the image producing means carried thereby.

Figure 1:
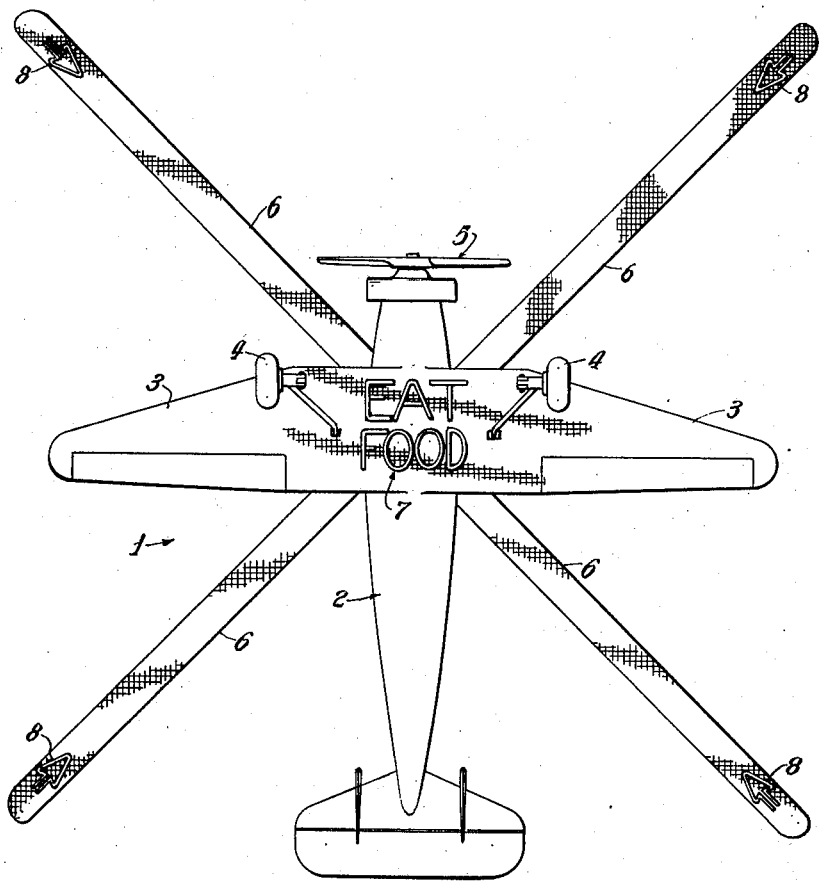
Fig. 1 is a bottom plan view of an autogiro embodying one form of my improved illusion device.

In carrying out the invention, I make use of the phenomenon known as "Visual persistence" and which constitutes the retention by the human eye of any image for about one-tenth of a second, even though the image be presented but for an instant. By reason of such retention, the image of a moving body, properly illuminated, will appear to the human eye as stationary for a period of time approximating one-tenth of a second. Therefore, should the same body or a similar moving body again be momentarily illuminated within this one-tenth second period, the image thereof will appear to remain stationary to the human eye.

It is, therefore, apparent that an image, constant to the eye, can be attained or produced, provided a body or plurality of indentical bodies be instantaneously illuminated at intervals of less than a tenth of a second at a time, when they occupy the same identical position at the instant of each illumination.

Similarly a body or image thereof can be made to appear to move more or less slowly in the direction of or opposite to its actual movement. This illusion may be produced by instantaneously illuminating the body at intervals of not more than one-tenth of a second and at instants when the body or identical bodies occupy actual positions spaced a small distance from the position of the previous image in either direction, at each successive illumination.

The illusion of motion of the images can best be produced by bodies having a constant or controlled rotary motion because in this manner, more identical images can most easily be illuminated while in identical or nearly identical positions.

In illuminating the bodies, the exclusion of all illumination other than the desired illumination is necessary, as the illusion depends on instantaneous flashes of illumination at intervals of less than one-tenth of a second. Therefore, the illusion may be carried out in darkness at night, daylight operation being inadvisable.

Either direct or indirect illumination may be employed but in each case the illumination must be interrupted into substantially instantaneous flashes and closely regulated as to speed. Such instantaneous flashes of illumination may be produced either by interrupting a constant source of illumination or by actually stopping and starting the illumination at the source. Either of the above methods of producing the desired flashes of illumination, may be carried directly by a moving body or supplied indirectly from an outside or independent source and reflected from the surface of said body.

Preferably the movement of the bodies used, is a rotary one and for aerial advertising the rotor blades of an autogiro admirably serve the purpose.

When such blades are used in connection with a source of reflected light as illumination, it is desired that such blades have a non-light reflecting surface as a back ground for the image producing body. Such a surface may be provided by painting the underside thereof a dull black, the body of the autogiro being painted in the same way. The image producing body is provided by a light reflective area, positioned in the same place on each blade, as accurately as it is possible to make them. Preferably such light reflective areas are all of the same shape and may be produced by painting said surfaces white so as to be in bold contrast with respect to the non-light reflecting back ground surface in which they are disposed.

If desired, a certain part of the underside of the body, in a definite area having the rotor mast as an axis, may be made non-light reflective and in said area may appear certain advertising matter, which is light reflective in character.

Under such conditions, a source of illumination capable of casting a strong beam is employed and such a source may be a search light located on the ground. Such a search light is mounted on a support for universal movement and associated therewith is means for interrupting the beam at the desired intervals or frequencies. The interrupter may be in the form of a motor driven, rotary disc with at least one opening therein. This opening is so arranged that in the rotation of the disc, as it comes into the plane of the beam, the illumination or light passes therethrough as an almost instantaneous flash. When the beam is trained on the autogiro in flight and the flashes as produced by the interrupted beam are synchronized with the rotation of the blades, the light reflective areas on the autogiro are momentarily illuminated. The motor is provided with suitable speed regulating means for properly timing the flashes with rotor blade speed and as the search light is mounted for universal movement, it can be so moved as to keep the autogiro within the range and area of the beam.

Thus with the rotor blades and light flashes properly timed, and operating in cycles of less than a tenth of a second, the illusion appears as four stationary arrows pointing toward the advertising matter on the fuselage. By speeding up the time intervals between flashes, the arrows appear to move in a circular path.

When a source of direct illumination is employed, the light reflecting area on the blades as well as the area on the fuselage bearing the advertising matter, may be outlined by luminous tubing. By suitable means on the autogiro, within easy reach for control by the operator, the luminosity of the tubing is interrupted. Such means may include a source of electrical energy and a suitable induction coil and in connection therewith is means for breaking the primary circuit of the coil. This means may be cam actuated breaker points and associated therewith is suitable manually operable means whereby the breaking periods may be accurately timed and advanced or retarded.

With the autogiro in flight and with the luminous tubing receiving energy so as to be illuminated, when the primary circuit to the tubing on the blades is broken, at intervals less than one-tenth of a second, the areas outlined by the tubing are illuminated as flashes as each blade reaches a particular position in its rotation.

This will create the illusion of an illuminated area standing still although each one is carried by a rotating body; namely, one of the rotor blades. By changing the time intervals between the almost instantaneous breaking and remaking of the primary circuit, the illuminated areas on the blade may be made to appear as though rotating in the direction of or opposite to that of the rotor blade and the number of positions may be changed so as to give the illusion of doubling the number of such areas.

It is apparent that the invention is also applicable to devices other than those capable of flight so that it is to be understood that the invention is not to be limited to its use in connection with an autogiro.

Referring now in detail to that embodiment of the invention, illustrated in the drawings and especially to Figs. 1 to 4 inclusive, 1 indicates as a whole an autogiro (as viewed from its underside) including a fuselage 2, wings 3, landing gear 4, engine driven propeller 5 and rotor blades 6, all arranged in the conventional manner of aircraft of this type. The said blades which as shown herein are four in number, are radially arranged with respect to a common mast (not shown) about which they rotate as an axis and are spaced apart at equal angles with respect to each other. These blades during flight rotate at a practically constant speed of about 120 R. P. M. Preferably the bottom sides of the fuselage, wings and blades will be neutralized with respect to illumination and are painted a non-light reflecting color such as black.

On the underside of the wings, in the vicinity of the axis about which the blades rotate, is a light reflective area arranged in the form of the desired advertising matter to be displayed. Preferably this matter which constitutes a real image is outlined by luminous tubing, using electrical energy carried by the autogiro itself. Such matter is indicated at 7 in Fig. 1.

On the outer end of the underside of each rotor blade is an unreal image producing means 8 in the form of an arrowhead, all of said arrowheads pointing toward the axis of rotation of said blades and consequently toward the matter 7 to which it is desired to direct attention. The unreal image producing means 8 is illuminated by a suitable source of electrical energy carried by the autogiro and in Fig. 2 said source of energy is shown as a battery 9. However, a wind or otherwise driven generator 10 as shown in Fig. 4 may be substituted therefor.

When a battery 9 is employed as a source of electrical energy, I employ in connection therewith an induction coil 11 as commonly used in automotive ignition systems to furnish voltage and amperage capable of illuminating the tubes of the unreal image producing means. This coil includes primary and secondary windings 11a and 11b respectively, both suitably grounded at one end as shown. The other end of the primary winding is connected by a conductor 12 with a fixed contact 13 and in said conductor is provided a manually operable switch 12a. Associated with the contact 13 is a contact 14 mounted on a vibratable spring arm 15 that is connected by a conductor 16 with the battery 9. A rotating cam 17 is so positioned with respect to the arm 15 as to vibrate the arm 15 and thus make and break engagement between the contacts 13 and 14. A condenser 18 is by-passed around the make and break mechanism as shown.

Figure 3:
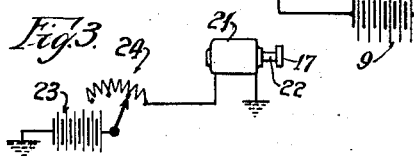
Fig. 3 is a detail diagrammatic view illustrating one manner in which the illumination may be interrupted to produce flashes at the desired intervals.

The other end of the secondary winding 11b leads to a brush 19 operatively engaged with a collector ring 20. All of the unreal image producing members 8 are connected in series and are grounded on one side as shown and are connected on the other side to a second brush 19 that is also operatively engaged with said collector ring. The cam 17 may be driven in any suitable manner by means, the speed of which may be variably controlled. In Fig. 3, I have illustrated said means as an electric motor 21 upon the armature shaft 22 of which the breaker cam 17 is mounted. 23 indicates a source of electrical energy for this motor, there being a rheostat 24 disposed in the circuit between the motor and said source of energy. By means of said rheostat the speed of said motor 21 and therefore the breaking of the primary circuit for the unreal image producing members may be controlled.

With the arrangement above described, it is apparent that illumination for both the real image or advertising matter 7, as well as the unreal image producing member 8 is supplied by means carried by the autogiro. Assume that the autogiro is in flight in a period of natural darkness. As its underside is painted a dull black, it is hardly visible from the ground, if at all. Thus, with the tubes forming the matter 7 constantly illuminated, it appears as though this illuminated matter or image alone were in flight.

When the switch 12a is closed, this connects the primary winding of the coil 11 with the battery 9 through the conductors 12 and 16, contacts 13 and 14 and arm 15. With the blades 6 rotating in flight and after the rheostat 24 has been actuated to energize the motor 21, the breaker cam 17 is rotated to vibrate the arm 15 and make and break or interrupt the primary circuit. These interruptions of course, effect the secondary circuit and thus produce the intermittent period of illumination of all of the unreal image producing members 8. By manipulating the rheostat these periods of illumination may be controlled as to the time factor.

These periods between illuminations are substantially one-tenth of a second or less in duration and this duration approximates the visual persistance or the retention of the human eye. It is apparent that with the several members 8 momentarily illuminated, at periods when said members occupy the same identical position (in the circular path of rotation thereof) at the instant of each illumination, an illusion is created of four stationary arrowheads pointing to the real image producing matter 7.

By manipulating the rheostat 24 to change the speed of the motor 21 and consequently the intervals of illumination of not more than a tenth of a second and at times when the members 8 occupy actual positions a short distance away (in the circular path) from the previous positions, the illusion is created of said members moving in the same or opposite direction of the actual rotation thereof as afforded by the blades.

Figure 2:
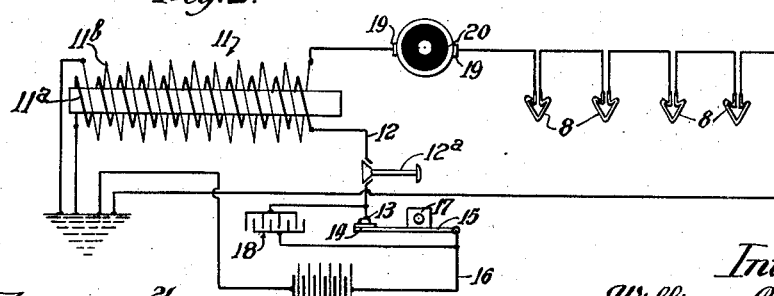
Fig. 2 is a diagrammatic view illustrating the electrical circuit of parts carried by the autogiro shown in Fig. 1 for the direct illumination of the image producing means thereof.

In Fig. 4, like parts are indicated by the reference numerals employed in connection with the arrangement shown in Fig. 2. In Fig. 4 however, the collector ring 20 and associated brushes are arranged in the conductor 12 and the secondary windings are quadrupled as indicated at 11c. One end of all of these windings are grounded as shown while the other end of each winding leads to an associated unreal image producing member 8 by conductor 11d, each member 8 being individually grounded as shown. This arrangement permits grounding of each member 8 to the tip of its associated blade 6 and eliminates the necessity of return leads which would increase weight and add mechanical complications.

Thus when the autogiro is in flight, the generator is wind driven and the energy generated thereby passes to the various members 8, the circuit being broken to provide illumination at the proper instants.

In Figs. 5 to 8 inclusive, I have shown means whereby the invention may be carried out by indirect illumination when the source of illumination for both the real and unreal image producing means is not carried by the autogiro but on the contrary, is disposed upon the ground.

With the indirect method of illumination, the real image producing means or matter 7a on the underside of the fuselage instead of being outlined by luminous tubing may be formed by painted areas capable of reflecting light or illumination. Likewise the unreal image producing members 8a instead of being made of luminous tubing are provided by painted areas. Preferably these areas are high white in color to present a strong contrast to the background as provided by the dull black of the parts upon which they are disposed. In Fig. 8, is shown an outer end part of one of the rotor blades, treated to represent such an area 8a on the black background of the blade.

In connection with the areas on the fuselage and blades of the autogiro just described, I provide means for projecting a beam of light or illumination upon the autogiro in flight. Such a means as shown herein includes a strong search light mounted on suitable tripod-like support so that the search light may be swung around and up and down whereby the beam may be made more easily to follow the autogiro in its flight. To give a greater range of flight in presenting the illusion, this search light may be mounted on an automotive vehicle.

In Fig. 5, I have illustrated the autogiro in flight with a search light on the ground throwing a beam of light which illuminates the entire autogiro. Said means includes a search light 25 fixed upon the top of an electric motor 26 having a universal joint-like mounting 27 upon a tripod-like support 28. The armature shaft 29 of said motor has fixed to that end associated with the lens end of the search light, an opaque beam interrupting disc 30. This disc is of such a diameter as to have its top peripheral portion, project radially beyond the beam of light or illumination and in said disc is provided an opening 31. In the rotation of this disc, each time the opening comes into register with the beam, said beam passes therethrough and immediately thereafter, the beam is blocked off by the remaining portion of the disc. Thus the beam is interrupted to cause flashes.

It is essential that the time intervals between flashes be regulated or controlled and this may be carried out in several different ways. One way is to control the speed of the shaft 29. For this purpose, a rheostat 32 is provided in the circuit, between the motor 26 and the source of electrical energy which in this instance is indicated as a battery 33. Another way is to provide the disc with a plurality of openings as indicated in dotted lines in Fig. 7. Again a combination of the two above mentioned ways may be employed.

The operation of the above mentioned parts is as follows:

Assume that the autogiro is in flight. If the source of light or illumination is not automotively mounted, the flight must be kept within a prearranged range. If the source of light or illumination is automotively mounted, this range may be increased in scope as it is possible for the light source to follow the autogiro.

In either instance, when the search light is energized, its beam of illumination is thrown or directed to envelop the autogiro. By reason of its universal joint-like mounting, the search light may be tilted up or down and sideways in either direction.

When the motor 26 is energized by the manipulation of the rheostat, the disc 30 is driven at the desired R. P. M. and the beam is interrupted thereby causing substantially instantaneous flashes occuring at intervals of less than a tenth of a second.

As the greater portion of the autogiro is made non-light reflective by being painted a dull black, only the light reflective portions will be visible with each flash.

The flashes are properly timed with respect to the rotation of the rotor blades so as to illuminate each blade reflective portion when said blades occupy the same identical position at the instant of illumination. Therefore the reflective portions of the blades will appear as constant images due to the visual persistence phenomenon before mentioned.

This light reflective portion can be made to appear to move more or less slowly in the same or opposite direction of its actual motion by producing the flashes at different timed instants. These instants of course, are when said image producing areas occupy actual positions a short distance away (in their circular path of movement) from the position of the previous image in either direction at each successive flash.

With the autogiro in flight, the operator by manipulating the search light, may keep the autogiro within its beam.

The illusory effects capable of being produced with the autogiro are variable in that the repeated images or design may be made to appear in any multiple of four (in the mechanism disclosed) by decreasing the intervals between flashes of illumination in large steps. These images can be made to appear to rotate in either direction or to stand still by increasing or decreasing the intervals between flashes by comparatively small steps.

The illusion presented is strongly attractive and being mystifying, holds the attention when once attracted. Therefore, its value as an advertising medium can be readily appreciated.

In describing the invention, I have referred in detail to the form, arrangement and construction of the various parts thereof, this, however, is to be considered merely as illustrative of preferred embodiments of the invention and I do not wish to be limited thereto except as may be specifically set forth in the appended claims.

I claim as my invention:

1. In a device of the kind described, the combination of a support, real image producing means associated with said support, a body movable in a definite path with respect to said support, unreal image producing means carried by said body, means for illuminating said real image producing means, and means for periodically illuminating said unreal image producing means when said body is in a predetermined position in its path of movement.

2. In a device of the kind described, the combination of a support, real image producing means associated with said support, a body movable in a definite path with respect to said support, unreal image producing means carried by said body, means for illuminating said real image producing means, and means for periodically illuminating said unreal image producing means when in different predetermined positions to create the illusion of the unreal image moving with respect to the real image.

3. In a device of the kind described, the combination of an aircraft, real image producing means carried thereby, a body carried by said aircraft but movable in a definite path with respect thereto, unreal image producing means carried by the body, means for illuminating said real image producing means and means for periodically illuminating said unreal image producing means when said body is in a predetermined position in its path of movement.

4. In a device of the kind described, the combination of an aircraft, real image producing means carried thereby, a body carried by said aircraft but movable in a definite path with respect thereto, unreal image producing means carried by the body, means for illuminating said real image producing means, and means independent of the aircraft and located remote therefrom when the same is in flight for periodically illuminating said unreal image producing means when said body is in a predetermined position in its path of movement.

5. In a device of the kind described, the combination of an autogiro, real image producing means on the bottom side of the body thereof, a plurality of rotor blades carried by the autogiro on the top side of said body, unreal image producing means on the bottom surface of certain of said blades, means for illuminating said real image producing means, and means for illuminating said unreal image producing means when said blades are in a definite position in the rotation thereof.

6. In a device of the kind described, the combination of an autogiro, real image producing means on the bottom side of the body thereof, a plurality of rotor blades carried by the autogiro on the top side of said body, unreal image producing means on the bottom surface of certain of said blades, means for illuminating said real image producing means, and means independent of the autogiro and located remote therefrom when the same is in flight for illuminating said unreal image producing means when said blades are in a definite position in the rotation thereof.

WILLIAM B. F. HALL.